(12) United States Patent
McDonald et al.

(10) Patent No.: US 10,445,709 B2
(45) Date of Patent: Oct. 15, 2019

(54) REAL TIME VIRTUAL DRAFT SYSTEM AND METHOD

(71) Applicant: The Toronto-Dominion Bank, Toronto (CA)

(72) Inventors: Ian James McDonald, Toronto (CA); Adam Douglas McPhee, Toronto (CA); Perry Aaron Jones Haldenby, Toronto (CA); Paul Mon-Wah Chan, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 454 days.

(21) Appl. No.: 15/278,852

(22) Filed: Sep. 28, 2016

(65) Prior Publication Data

US 2018/0089645 A1   Mar. 29, 2018

(51) Int. Cl.
| | |
|---|---|
| *G06Q 40/00* | (2012.01) |
| *G06Q 20/10* | (2012.01) |
| *G06Q 20/38* | (2012.01) |
| *G06Q 20/40* | (2012.01) |
| *G06Q 20/36* | (2012.01) |

(52) U.S. Cl.
CPC .......... *G06Q 20/10* (2013.01); *G06Q 20/367* (2013.01); *G06Q 20/381* (2013.01); *G06Q 20/3829* (2013.01); *G06Q 20/405* (2013.01)

(58) Field of Classification Search
CPC .... G06Q 20/10; G06Q 20/367; G06Q 20/381; G06Q 20/3829; G06Q 20/405
See application file for complete search history.

(56) References Cited

U.S. PATENT DOCUMENTS

| | | | | |
|---|---|---|---|---|
| 9,275,389 B1* | 3/2016 | Dides | ............. | G06Q 20/405 |
| 2008/0319875 A1* | 12/2008 | Levchin | ............. | G06Q 20/02 |
| | | | | 705/44 |
| 2011/0196787 A1* | 8/2011 | Alroy | ............. | G06Q 20/065 |
| | | | | 705/41 |
| 2014/0365363 A1* | 12/2014 | Knudsen | ............. | G06Q 20/3674 |
| | | | | 705/41 |
| 2015/0170112 A1* | 6/2015 | DeCastro | ............. | G06Q 20/381 |
| | | | | 705/39 |
| 2015/0178757 A1* | 6/2015 | Moshal | ............. | G06Q 20/14 |
| | | | | 705/14.26 |
| 2016/0148192 A1* | 5/2016 | Storonsky | ............. | G06Q 20/351 |
| | | | | 705/17 |

(Continued)

*Primary Examiner* — Thien M Le
(74) *Attorney, Agent, or Firm* — Duane Morris LLP (57) ABSTRACT

An apparatus for use in a digital asset tracking system includes a storage device and a processor coupled to the storage device. The storage device stores software instructions for controlling the processor that when executed by the processor configure the processor to receive a signal representing a request comprising a first transfer from a first digital container associated with a first client to a second digital container associated with a second client. A value of the first transfer is compared to a total value in one or more accounts associated with the first client. At least one of the one or more accounts associated with the first client has a value in a first currency. A first draft is generated from a first account to an account associated with the second client. The first draft comprises a value in a second currency equivalent to the value of the first transfer.

20 Claims, 6 Drawing Sheets

(56) References Cited

U.S. PATENT DOCUMENTS

| | | |
|---|---|---|
| 2017/0324750 A1 | 11/2017 | Khan |
| 2017/0337548 A1* | 11/2017 | Griggs .................. G06Q 20/34 |
| 2018/0060898 A1* | 3/2018 | Sharma .............. G06Q 30/0227 |
| 2018/0089655 A1* | 3/2018 | McDonald ............. G06Q 20/02 |
| 2018/0293576 A1* | 10/2018 | Song ................... G06Q 20/401 |

* cited by examiner

REAL TIME VIRTUAL DRAFT SYSTEM AND METHOD

FIELD

This disclosure relates generally to improvements in computer related technology.

BACKGROUND

Distributed electronic ledgers, such as block chains, have generated interest in a variety of fields as a decentralized data storage mechanism with reliable redundant validation.

A block chain includes a distributed database comprising blocks of data records (e.g., transaction records). Each block has a timestamp and a hash of the immediately preceding block. Blocks record and confirm valid transactions. Users known as miners perform proof-of-work in the course of generating the blocks. The amount of time needed to perform the proof-of-work can introduce significant delays between the time a valid transaction is first received by one of the miners and incorporation of the transaction into a block.

In addition, the selection of draft instruments for completion of a payment request in a transaction can introduce delays in completion of transactions, such as retail transactions. Current draft selection and/or generation introduces complexities into a transaction, such as, for example, capital verification requirements, identity verification requirements, credit verification requirements, and/or other additional complexities that can increase the time required to authorize or complete a transaction.

SUMMARY

In some embodiments, an apparatus for use in a digital asset tracking system tracking digital assets including digital accounts having digital containers includes a storage device and a processor coupled to the storage device. The storage device stores software instructions for controlling the processor that when executed by the processor configure the processor to: receive a signal representing a request comprising a first transfer from a first digital container associated with a first client to a second digital container associated with a second client; compare a value of the first transfer to a total value in one or more accounts associated with the first client; and generate a first draft from a first account to an account associated with the second client. The at least one of the one or more accounts associated with the first client has a value in a first currency. The first draft comprises a value in a second currency equivalent to the value of the first transfer.

In some embodiments, a system includes a point-of-sale terminal and an authorization server. The point-of-sale terminal has a storage device and a processor and an authorization server having a storage device and a processor. The storage device of the point-of-sale terminal stores software instructions for controlling the processor that when executed by the processor configure the processor to: generate a signal representing a request comprising a first transfer from a first digital container associated with a first client to a second digital container associated with a second client; and receive a signal representing a transaction indication from the authorization server. The storage device of the authorization server stores software instructions for controlling the processor that when executed by the processor configure the processor to: receive the signal representing the request comprising the first transfer; compare a value of the first transfer to a total value in one or more accounts associated with the first client; validate the request if the total value in the one or more accounts associated with the first client is greater than or equal to the value of the first transfer; invalidate the request if the total value in the one or more accounts associated with the first client is less than the value of the first transfer; and transmit the signal representing the transaction indication to the point-of-sale terminal. At least one of the one or more associated accounts has a value in a first currency. The transaction indication indicates that the transaction request has been validated or invalidated.

In some embodiments, an apparatus for use in a digital asset tracking system tracking digital assets including digital accounts having digital contains is disclosed. The digital asset tracking system includes a storage device and a processor coupled to the storage device. The storage device stores software instructions for controlling the processor that when executed by the processor configured the processor to: receive a signal representing a request comprising a first transfer from a first digital container associated with a first client to a second digital container associated with a second client; compare a value of the first transfer to a total value in one or more accounts associated with the first client; and transmit to the second client a signal representing a transaction authorization when the total value in the one or more accounts is greater than or equal to the value of the first transfer. At least one of the one or more accounts associated with the first client has a value in a first currency.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

One advantage of block chain based ledgers is the public nature of the block chain architecture that allows anyone in the public to review the content of the ledger and verify ownership. The decentralized block chain approach also makes the system fairly robust in comparison to centralized server systems by allowing multiple distributed networks to verify the contents of a single ledger. This allows for redundancy and minimizes risk of falsification of ledgers. The size of the block chain often makes it an onerous task to search and pin point a specific transaction. Searching through a block chain construct is a computationally intense process.

To achieve a desired level of confidence that a party transferring a block chain tracked asset (e.g., a buyer making a payment for goods using digital currency) is not double spending, the recipient (e.g., a seller) typically waits until a desired number of block chain peer processors have published a block in the block chain containing the transaction transferring that asset, before the recipient transfers the goods to the buyer. For example, the seller may wait until six blocks containing the transaction are published, which can take more than an hour in some cases, before the seller delivers goods or services to the buyer. This extended delay between payment and delivery is atypical of retail sales in bricks-and-mortar stores, where buyers often expect immediate delivery of goods or services upon tender of payment. Such delays can impede the widespread use of digital currency in settings and transactions where immediate delivery of goods or services is expected upon tender of payment.

This disclosure provides systems and methods for real-time drafting for transactions including a transfer of a digital asset tracked as a distributed electronic ledger, such as a block-chain ledger. A first party initiates a transaction including a transfer of a digital asset, such as a distributed ledger-based currency. The transaction is provided to a central authority for authorization and/or real-time drafting. The central authority provides authorization for transactions including a transfer of digital assets. The central authority receives the transaction request and compares a value of the digital assets to be transferred by the first party to a total asset value in one or more accounts associated with the first party. If the central authority determines that the assets in the one or more accounts have a total value equal to or greater than the value of the digital assets to be transferred, the central authority provides authorization to complete the without waiting for a confirmation from the distributed ledger regarding the transfer. This mechanism provides a sufficient degree of certainty to allow use of digital assets as a medium of exchange in situations (e.g., brick-and-mortar retail sales, service exchanges, etc.) involving near-real-time delivery of goods or services upon tender of payment.

In some embodiments, this disclosure provides a system and method for substituting high-confidence payments to the receiver in place of a transfer of the digital asset directly from the sender to the receiver. The central authority receives the transaction request and provides authorization for the transaction as described above. In some embodiments, the central authority further provides payment from one or more payment sources other than the transfer of digital assets between the sender and the receiver. For example, in some embodiments, the central authority provides payment from one or more accounts managed/owned by the central authority to an account managed/owned by the receiver. The payment can be in any form such as the original digital asset, a different digital asset, a fiat currency, and/or any other form. In some embodiments, the central authority provides the payment to the receiver in place of the transfer of the digital asset from the sender to the receiver. The central authority can generate a new transfer of the digital asset from the sender to the central authority and transmits the new transfer to one or more peers for processing.

Figure 1:
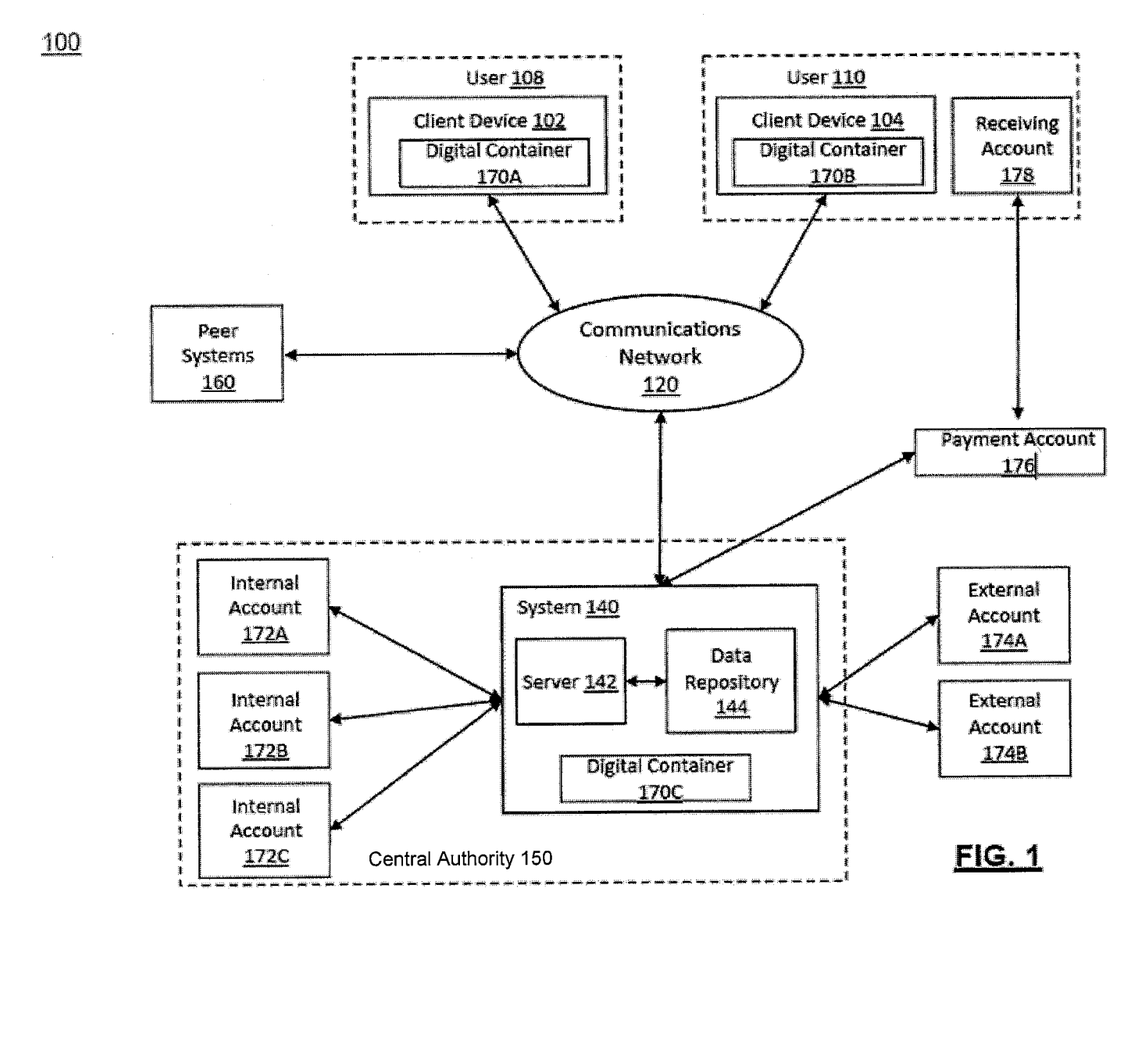
FIG. 1 is a block diagram of a system according to some embodiments.

FIG. 1 is a block diagram of a system 100 in accordance with some embodiments of the present disclosure. System 100 may be a computing environment including client devices 102, 104, system 140, one or more peer systems 160, and a communications network 120 connecting various components of system 100. Although two client devices 102, 104 are shown in this example, any number of client devices may be present. In some embodiments, at least one of the client devices 104 is a point-of-sale (POS) terminal in a retail location. Various components of computing environment 100 are configured to address problems associated with conventional block-chain-based ledger transactions by providing a system and method configured to provide authorization of block-chain-based transactions prior to updating the block-chain ledger. In various embodiments, the resulting processing architecture facilitates immediate authorization of transactions by the system 140, thus providing a solution that allows real-time transactions in one or more block-chain-based currencies (e.g., crypto-currency).

In some embodiments, the first client device 102 is associated with a first digital container 170A with an address of the respective user 108 and the second client device 104 is associated with a second digital container 170B with an address of the respective merchant 110. For example, in the case where the digital asset is a digital currency tracked in a distributed electronic ledged, such as a block-chain ledger, the first and second digital containers 170A, 170B are digital wallets containing the digital currency. The first client device 102 and/or the POS terminal 104 are configured to execute one or more programs for initiating a transfer of digital assets from the first digital container 170A to the second digital container 170B. The transfer can be executed by transmitting a transfer request through the communications network 120 to one of the system 140 or the peers 160.

Figure 2:
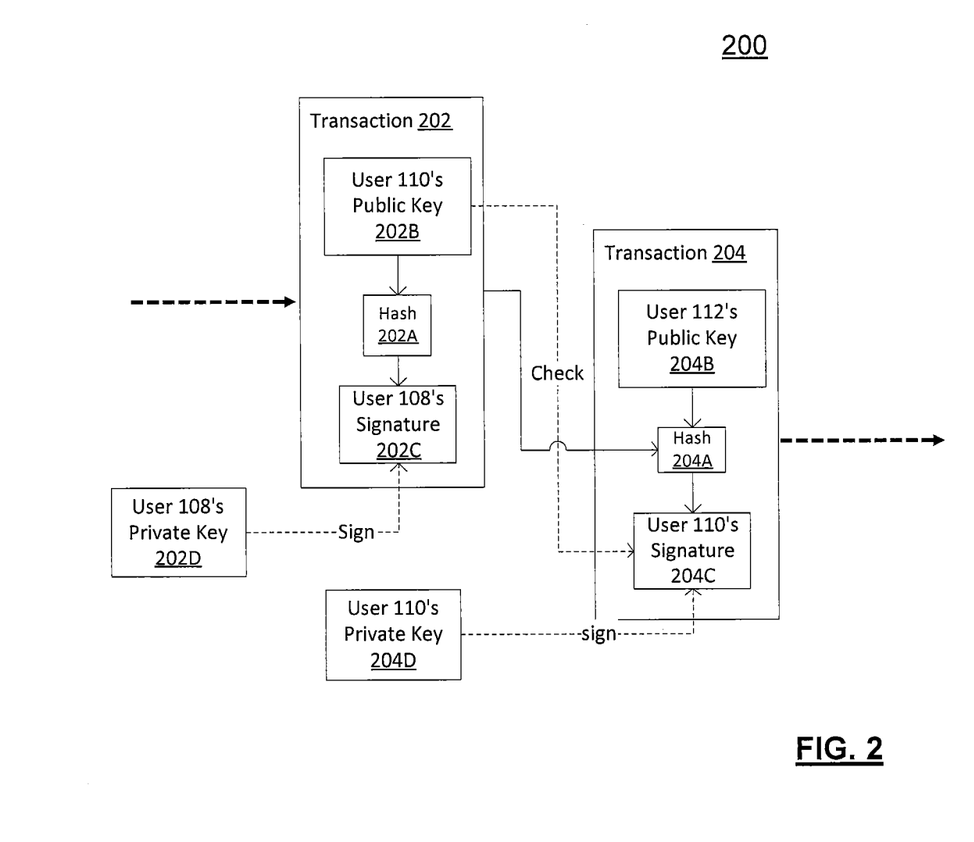
FIG. 2 is a schematic diagram of a block-chain ledger-based transaction, according to some embodiments.

FIG. 2 is a diagram of a structure 200 of a convention block-chain ledger, which may be generated through the interaction of components of computing environment 100. In the example of FIG. 2, user 108 is associated with client device 102, which executes a stored software application (e.g., a wallet application) capable of obtaining a current version of a conventional block-chain ledger from one or more networked computer systems (e.g., one of peer systems 160 configured to "mine" broadcasted transaction data and update ledgers). In some embodiments, a block-chain ledger may represent a "longest" block-chain ledger than includes a maximum number of discrete "blocks." The blocks identify respective transactions that transfer and/or distribute portions of tracked assets among various owners, including user 108.

FIG. 2 shows blocks corresponding to two transactions 202 and 204, with arrows to the left and right of these transactions indicating that these are merely two transactions in a potentially longer series of chained blocks (hence the term "block-chain ledger"). In the first transaction (transaction 202) depicted in FIG. 2, user 108 transfers ownership of a portion of tracked assets (e.g., of some amount of a virtual currency or crypto-currency) to user 110. In the second transaction (transaction 204), user 110 transfers ownership to a third user 112. In general, any number of transactions may be supported.

Client device 104 obtains the current block-chain ledger and processes the block-chain ledger to determine that a prior owner (user 108 in this example) transferred ownership of a portion of the tracked assets to user 110 in transaction 202. One or more peer systems 160 previously verified, processed, and packed data associated with transaction 202 into a corresponding block of the conventional block-chain.

Transaction 202 includes a cryptographic hash (e.g., hash 202A) of one or more prior transactions, and a public key of the recipient (e.g., public key 202B of user 110). The transaction data may also include a digital signature 202C of user 108 (the prior owner), which is applied to hash 202A and public key 202B using a private key 202D of user 108 through any of a number of techniques apparent to one of skill in the art. The presence of user 108's public key within transaction data included within the conventional block-chain ledger facilitates verification of user 108's digital signature 202C by client device 104 and/or peer systems 160.

One or more of peer systems 160 may receive the data specifying transaction 204 from client device 104. In certain instances, peer systems 160 may act as "miners" for the block-chain ledger, and may competitively process the received transaction data (either alone or in conjunction with other data) to generate additional blocks of the ledger, which may be appended to the block-chain ledger and distributed across peer systems 160 (e.g., through a peer-to-peer network) and to other connected devices of environment 100.

Conventional block-chain ledger architectures enable the public to review content of the ledgers and verify ownership details. The decentralized nature of conventional block-chain ledgers enables multiple distributed networks to verify the contents of a single ledger. The resulting redundancy may render conventional block-chain ledger architecture more robust than centralized server systems, and effectively eliminates the falsification of ledger data by malicious parties.

Despite these positive characteristics, conventional block-chain ledger architectures have certain drawbacks when implemented by merchants, retailers, or other parties requiring real-time authorization and/or approval of one or more transactions. For example, in conventional block-chain ledger architectures, data specifying a transaction 202 is transmitted to a plurality of peer systems 160, which process the transaction based on one or more parameters, such as the time elapsed since the data specifying the transaction 202 was generated, a processing fee associated with the transaction 202, and/or any other suitable parameters. Processing time of a transaction 202 may be in a range of about 10 minutes to about 1 hour, with some transactions taking several hours due to high processing volume, low processing fee rewards, and/or other parameters. The processing delays experienced in block-chain mining is atypical of retail transactions, which have a common expectation of real-time processing that provides near real-time authorization for a transaction (e.g., authorization takes seconds as opposed to minutes or hours).

Various embodiments of the present systems and methods address the foregoing deficiencies of conventional block-chain ledger architectures by providing a central authority 150 that partitions a block-chain ledger-based transaction and provides immediate authorization of the transaction to a client 106, such as a retailer operating a POS terminal. Furthermore, various embodiments provide a framework that gives recourse to merchants and/or customers in the event of a disputed transaction, return, or other issue, while maintaining the public availability and verification characteristics of block-chain ledgers.

Client Devices

Referring back to FIG. 1, each of the client devices 102, 104 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), a point-of-sale terminal (POS), and/or any other type of computing device that may be configured to store data and software instructions, execute software instructions to perform operations, and/or display information on a display device. At least one of client devices 102, 104 may be associated with one or more users, such as users 108, 110, as shown in FIG. 1. At least one of the client devices 104 may be a point-of-sale (POS) terminal and/or an internet commerce server. For example, user 110 can be a retailer operating client device 104 as a POS terminal in a retail location.

Each client device 102, 104 includes one or more tangible, non-transitory memories that store data and/or software instructions, and one or more processors configured to execute software instructions. Client devices 102, 104 may include one or more display devices that display information to a user and one or more input devices (e.g., keypad, keyboard, touchscreen, voice activated control technologies, or any other type of known input device) to allow the user to input information to the client device.

In one aspect, each client device 102, 104 stores in memory one or more software applications that run on the client device and are executed by the one or more processors. In some instances, each client device stores software applications that, when executed by one or more processors, perform operations that establish communications with a central authority 150. The central authority 150 can comprise a financial institution and/or other clearing house. The central authority 150 operates a system 140 configured to receive a transaction request from one or more of the client devices and provide authorization for the transaction. In some embodiments, a first subset of the client devices 102, 104 are in communication with a central authority 150 and a second subset of the client devices 102, 104 are in communication with the first subset of client devices.

Each client device 102, 104 may execute the stored software application(s) to generate a transaction that includes data identifying one or more tracked assets, a public key of one or more users, and/or additional transaction data. The executed software applications may cause client devices 102, 104 to transmit the data specifying the transaction 202. In conventional block-chain ledger-based systems, the client devices 102, 104 transmit a transaction 202 to one or more peers 160 for processing. In the present system, the transaction 202 can be transmitted to the system 140 for further processing prior to and/or instead of transmission to one or more peers 160. In some embodiments, the stored application(s) include a wallet application provided by the central authority 150 (e.g., a mobile wallet application or an application executable on a desktop computer). The wallet application is capable of initiating transactions denominated in one or more currencies, including crypto-currencies such as Bitcoin™.

Exemplary Computer Systems

System 140 may be a computing system configured to execute software instructions to perform one or more operations in accordance with various embodiments. In one aspect, system 140 is associated with the central authority 150 (e.g., a financial institution) that provides financial accounts, financial services transactions, and investment services to one or more users (e.g., customers of the central authority 150). In some aspects, system 140 is a distributed system that includes computing components distributed across one or more networks, e.g., network 120.

In one aspect, system 140 includes computing components configured to store, maintain, and generate data and software instructions. For example, system 140 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of computing environment 100.

In one embodiment, server 142 includes a computer (e.g., a personal computer, network computer, or mainframe computer) having one or more processors that are selectively activated or reconfigured by a computer program. In one aspect, server 142 (or other computing components of system 140) may be configured to provide one or more websites, digital portals, etc., that provide services consistent with central authority 150, such as a digital banking or POS terminal transaction portal. For instance, server 142 may be configured to receive transaction requests from a POS terminal and provide authorization for completing the transaction to the POS terminal.

In other aspects, server 142 (or other computing components of system 140) may be configured to provide information to one or more application programs executed by client device 104, e.g., through a corresponding application programming interface (API). For example, client device 104 may execute an application program associated with and provided by central authority 150, such a mobile banking application, point-of-sale applications, and/or a mobile wallet application, to provide services in accordance with various embodiments. In some instances, server 142 provides information to client devices 102, 104 (e.g., through the API associated with the executed application program), and client devices 102, 104, present portions of the information to corresponding users through a corresponding graphical user interface (GUI).

Server 142 (or other computing components of system 140) may be configured to provide to client devices 102, 104 (and/or receive from any of the client devices) information associated with services provided by central authority 150. For example, client device 104 may receive the transmitted information, and store portions of the information in locally accessible storage device and/or network-accessible storage devices and data repositories (e.g., cloud-based storage). In one instance, client device 104 executes stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, central authority 150 may represent a "controlling entity" capable of regulating transaction assets (e.g., units of virtual currency, units of fiat currency, units of various financial instruments, physical assets, etc.) tracked within various public and/or private accounts, in accordance with various embodiments. For example, one or more computing components of system 140 (e.g., server 142) may be configured (e.g., by executed software instructions) to manage one or more transaction assets associated with the central authority 150 and/or a client devices 102, 104, may maintain one or more accounts 172a-172c (collectively "internal accounts 172") associated with one or more client devices 102, 104, and/or may be configured to manage one or more external accounts 174a, 174b (collectively "external accounts 174") associated with client devices 102, 104.

Exemplary Data Repositories and Stored Data

Data repository 144 may include one or more memories that are configured to store and provide access to data and/or software instructions. Such memories may include tangible non-transitory computer-readable media that store software instructions that, when executed by one or more processors (e.g., of server 132), perform one or more operations in accordance with various embodiments. Data repository 144 may also be configured to store information relating to central authority 150, e.g., a financial institution.

For instance, data repository 144 may store customer data that uniquely identifies customers of a financial institution associated with system 140. As one example, a customer of the financial institution (e.g., any of users 108, 110) may access a web page associated with system 140 (e.g., through a web server executed by a corresponding front end), and may register for digital banking services and provide data, which may be linked to corresponding ones of the users 108, 110 and stored as customer data within data repository 144. The stored customer data may, for example, include personal information, government-issued identifiers, employment information, and contact information. The stored customer data may also include authentication credentials associated with registered users of the financial institution, e.g., a user name, a user-specified password, a system-generated password, an alphanumeric identification number (e.g., a PIN number) specified by the users or assigned by financial system 140, biometric information, and information facilitating enhanced authentication techniques. The stored customer data can be used to generate and/or manage one or more financial accounts 172a-172c maintained by the central authority 150. The stored customer data can be further used to access and/or interact with accounts 174a-174b associated with the registered users but not maintained by the central authority 160.

Data repository 144 may store a rules engine identifying one or more rules that regulate available terms and conditions for one or more drafts, generation of one or more drafts, and any other action involving tracking, approval, or generation of real time drafts.

In some aspects, system 140 is configured to establish one or more of the rules based on one or more internal regulations associated with central authority 150. In other aspects, system 140 may establish one or more of the rules based on information received from one or more of users 108, 110, e.g., as input provided to a web page or other graphical user interface (GUI) presented by client devices 102, 104, and/or 106 and provided to system 140.

Data repository 144 may also store a copy of private crypto keys associated with users 108, 110. For example, system 140 may be configured to store the private crypto keys in a data structure that includes information that associates the private crypto keys with corresponding users 108, 110. In some embodiments, the data repository 144 is configured to store a master crypto key associated with a digital asset, such as a centrally-managed digital currency.

Exemplary Communications Networks

Communications network 120 may include one or more communication networks or media of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Transaction Authorization System

In some embodiments, a client device 104 includes a POS system operated by a retailer 110 at a retail location. Using standard block-chain ledger systems, a user wishing to pay with a digital asset, such as a crypto-currency, would have to wait for the peer systems 160 to mine a new block containing the transfer of the digital assets from a digital container 170A associated with the user 108 to a digital container 170B associated with the retailer 112 before the transaction is completed. Alternatively, in some embodiments, one or more intermediary systems exist which control the tracked assets and delay transfer thereof. The extended authorization times of traditional block-chain ledger transactions are atypical in retail and other consumer environments and prevent the adoption of digital asset transactions for many consumer transactions. In some embodiments, the system 140 configured to provide authorization to a client device 106 to complete a transaction that includes a transfer of a digital asset without waiting for confirmation of the transfer on a related block-chain ledger. For example, in some embodiments, the system 140 is configured to provide authorization of a transaction including a transfer of digital assets prior to transfer of the actual digital assets based on the value in one or more accounts associated with the transferor of the digital assets. In some embodiments, the central authority 150 can complete the transaction using a monetary asset other than the originally transferred digital asset.

Figure 3:
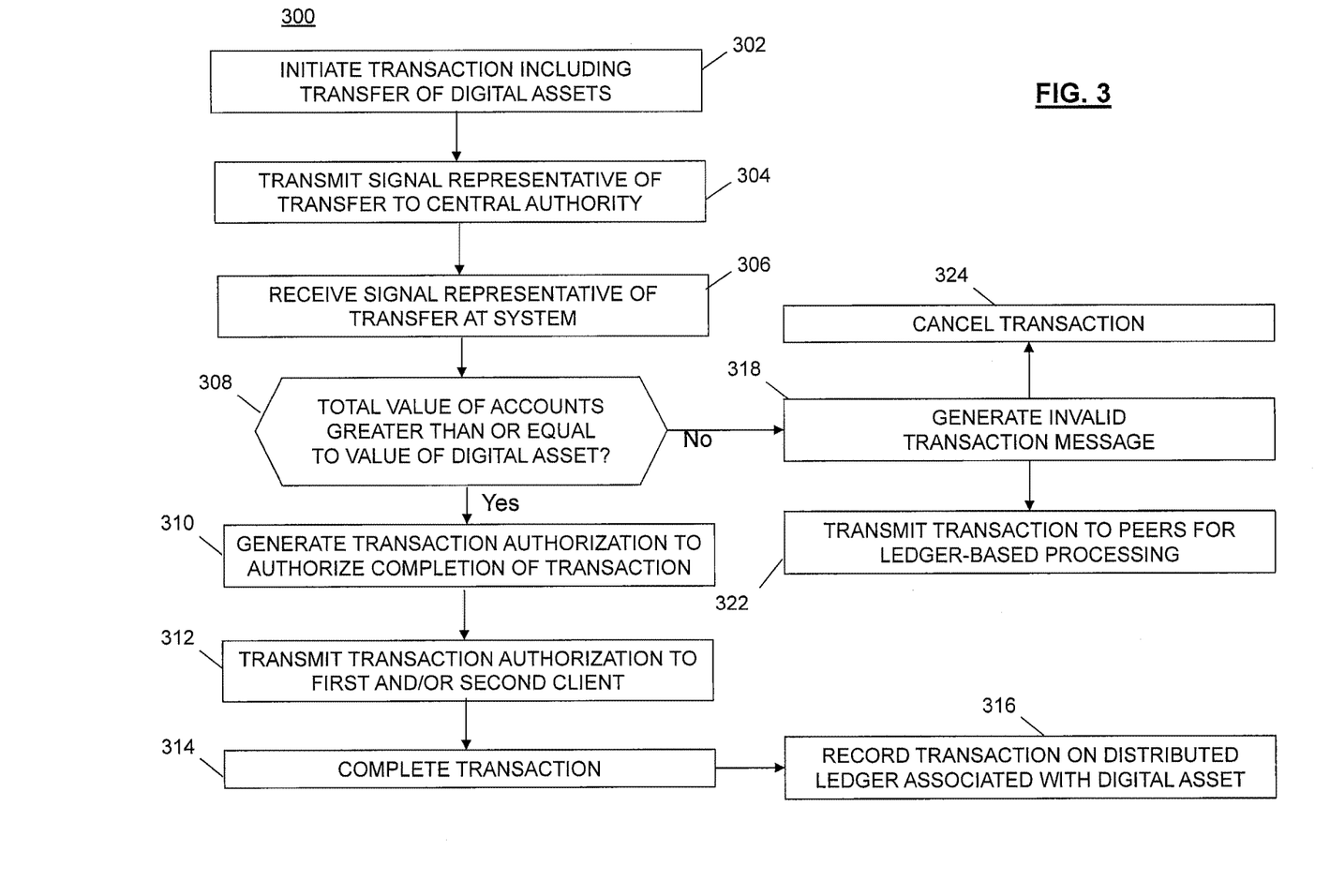
FIG. 3 is a flow chart of a method of authorizing a transaction including a transfer of a digital asset, in accordance with some embodiments.

FIG. 3 illustrates one embodiment of a method 300 for providing real-time authorization to for transactions including a transfer of digital assets, such as a retail transaction performed with a crypto-currency. At step 302, the first client device 102 initiates a transaction including a transfer of digital assets from the first digital container 170A associated with the first client device 102 to the second digital container 170B associated with the second client device 104. The transaction can include an exchange of the digital asset for one or more goods (e.g., a retail transaction using a crypto-currency), payment of a debt (e.g., payment of debts using a crypto-currency), payment for services (e.g., contractual payments using a crypto-currency), and/or any other suitable transaction. The digital assets can include any suitable digital asset, such as, for example, block-chain ledger-based digital assets including, but not limited to, crypto-currencies (e.g., Bitcoin™), smart contracts (e.g., Ethereum), and/or any other block-chain ledged-based digital asset. Although embodiments are discussed herein including transfer a block-chain based digital currency (e.g., crypto-currency), it will be appreciated that the disclosed methods can be adapted for any digital asset tracked by a distributed ledger.

At step 304, a transaction request including the transfer of the digital asset is transmitted from one of the first client 108 or the second client 112 to the system 140. In some embodiments, the transaction request includes a digital signature of the first client 108 generated by one or methods. For example, in some embodiments, the digital signature is generated by a combination of a public and private cryptographic keys maintained by the first user 108, the second user 112, and/or a central authority 150. The transaction request is transmitted over the communications network 120 to the system 140. In some embodiments, the transaction request is formatted as a standard ledger transaction for a ledger-based digital asset, for example, and includes a transfer container address, a receiving container address, a public/private cryptographic signature, and/or any other information specified by a distributed ledger. In some embodiments, the transaction request is formatted based on one or more parameters established by the central authority 150, such as a retailer identifier, bibliographic information, account information for associated accounts, and/or any other suitable information.

At step 306, the system 140 receives and validates the transaction request. Validation of the transaction request includes verification that the transaction request was generated by an authorized partner of the system 140, such as an authorized retailer. The system 140 is configured to validate the transfer request based on one or more elements of the request, such as, for example, one or more public and/or private cryptographic keys and/or digital signatures included in the request, a container address/identification number of the first digital container 170A and/or the second digital container 170B, and/or any other suitable authentication information. For example, in some embodiments, a retailer signs a transaction request with a public/private cryptographic key which is verified by the central authority 150. The public/private cryptographic key can be any suitable cryptographic key, such as a key issued by the central authority, issued by a ledger-based system, and/or any other suitable key.

After authenticating the transaction request, at step 308, the system 140 compares a value of the digital asset(s) to be transferred from the first client 108 to the second client 112 to a total value of assets contained in one or more accounts 172, 174 associated with the first client 108. The value of the digital asset(s) can be, for example, the value of the digital asset in a benchmark crypto-currency, the value of the digital asset in one or more benchmark fiat currencies, and/or any other suitable benchmark value. The accounts 172, 174 can include any suitable monetary and/or non-monetary accounts, such as, for example, fiat currency accounts (such as bank accounts, investments accounts, etc.), digital wallets (such as crypto-currency wallets), real property holdings (such as real-estate, stocks, etc.), and/or any other suitable financial account and/or instruments. The accounts 172, 174 can include accounts maintained by the central authority 150 (internal accounts 172) and/or accounts maintained by a third party (external accounts 174).

Figure 4:
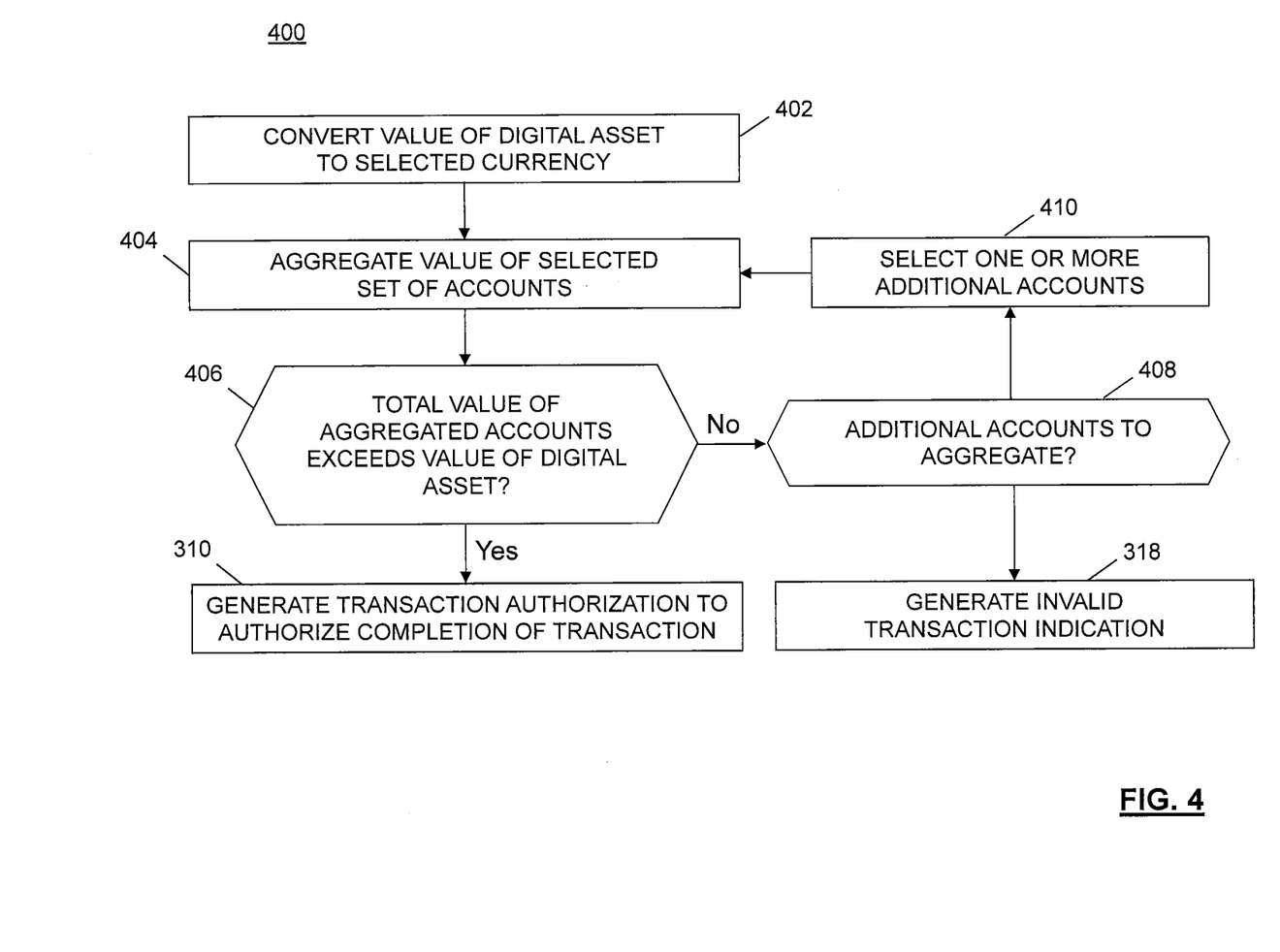
FIG. 4 is a flow chart of a method of comparing a value of a digital asset to a total value of one or more accounts, in accordance with some embodiments.

In some embodiments, the system 140 determines whether the one or more accounts 172, 174 contain a value equal to or greater than a value of the digital asset(s). FIG. 4 illustrates one embodiment of a method 400 of comparing the value of the digital asset to one or more accounts 172, 174. In a first step 402, the system 140 converts the value of the digital asset to a selected benchmark currency (such as a fiat currency, a crypto-currency, etc.). At step 404, the system 140 aggregates the value of a selected set of the accounts 172, 174. The aggregated accounts can be accounts 172, 174 maintained in the selected currency value and/or have values converted to the selected currency. For example, in some embodiments, one or more of the accounts include non-monetary financial instruments, such as, for example, stock, bonds, and/or other instruments. The system 140 is configured to estimate the value of the non-monetary financial instruments, for example, based on current market prices, to generate a value of the non-monetary financial instruments in the selected benchmark currency. In other embodiments, the accounts 172, 174 are maintained in a currency other than the selected benchmark currency and the value of the accounts is converted based on a current exchange rate maintained by the system 140.

At step 406, the system 140 compares the value of the aggregated accounts to the value of the digital asset. In some embodiments, if the value of the aggregated accounts is greater than and/or equal to the value of the digital asset, the method 300 proceeds to step 310. If the value of the aggregated accounts is less than the value of the digital asset, the method 400 proceeds step 408. At step 408, in some embodiments, one or more additional accounts 172, 174 are reviewed to generate a new aggregate comparison value. The method returns to step 406 and continues adding linked accounts until the aggregated value is greater than or equal to the digital asset, the number of aggregated accounts exceeds a predetermined limit, and/or no additional linked accounts are available for aggregation. If the total aggregated value calculated by the system 140 is less than the value of the digital asset, the method 300 proceeds to step 318.

At step 310, the system 140 generates a transaction authorization authorizing completion of the original transaction. The transaction authorization is provided without requiring that the transfer of digital assets from the first digital container 170A to the second digital container 170B actually occur. In some embodiments, the generated transaction authorization 314 is digitally signed by a cryptographic key associated with a central authority 150. The cryptographic key can be a key associated with one or more digital containers 170c maintained by the central authority 150, a master key maintained by the central authority 150, a verification key maintained by the central authority 150 for the sole purpose of signing transaction authorizations, and/or any other suitable key. The digital signature provides for authentication of the transaction authorization by the receiving party, such as the second client device 104.

At step 312, the transaction authorization is transmitted to at least one of the first client device 102 and/or the second client device 104. At step 314, the transaction is completed. The second client device 104 (e.g., a retailer) can complete the transaction (e.g., retail transaction) with confidence that the value of the digital asset will be received without waiting the typical processing time associated with recording the transfer on an associated distributed ledger.

At step 316, the transaction is recorded on the distributed ledger associated with the digital asset. For example, in some embodiments, at least one of the first client device 102 and/or the second client device 104 transmits a transfer of the digital asset from the first container 170A to the second container 170B to one or more peers 160 for inclusion in a distributed ledger, such as a block-chain based ledger. In some embodiments, the transfer of the digital asset can be transmitted to the peers 160 simultaneously with the transmission of the transaction to the system 140 at step 304. If the central authority 150 provides transaction authorization, the transaction can be completed prior to processing of the transfer by the one or more peers 160. If the central authority 150 does not provide transaction authorization, the first client device 102 and/or the second client device 104 can wait for successful processing of the transfer by the one or more peers 160 before completing the transaction. In some embodiments, the transfer is provided to the one or more peers 160 only after the system 140 provides transaction authorization for the transaction. The transfer can be provided to the one or more peers 160 by the first client device 102, the second client device 104, and/or the system 140.

At step 308, if the system 140 determines that the one or more accounts have a total value less than the value of the digital asset, the method proceeds to step 318. At step 318, the system 140 generates an invalid transaction message. The invalid transaction message can include information regarding why the transaction was not authorized (e.g., insufficient value in one or more accounts 172, 174). At step 320, the system 140 transmits the invalid transaction message to one or more of the first client device 102, the second client device 104, and/or a third party. In some embodiments, at step 322, the first client device 102 and/or the second client device 104 transmits a transfer of the digital asset to one or more peers for processing and waits for confirmation from the one or more peers, for example in the form of an updated block on a block-chain, prior to completing the transaction. In some embodiments, at step 324, the second client device 104 cancels the transaction and/or requests a different form of payment.

Figure 5:
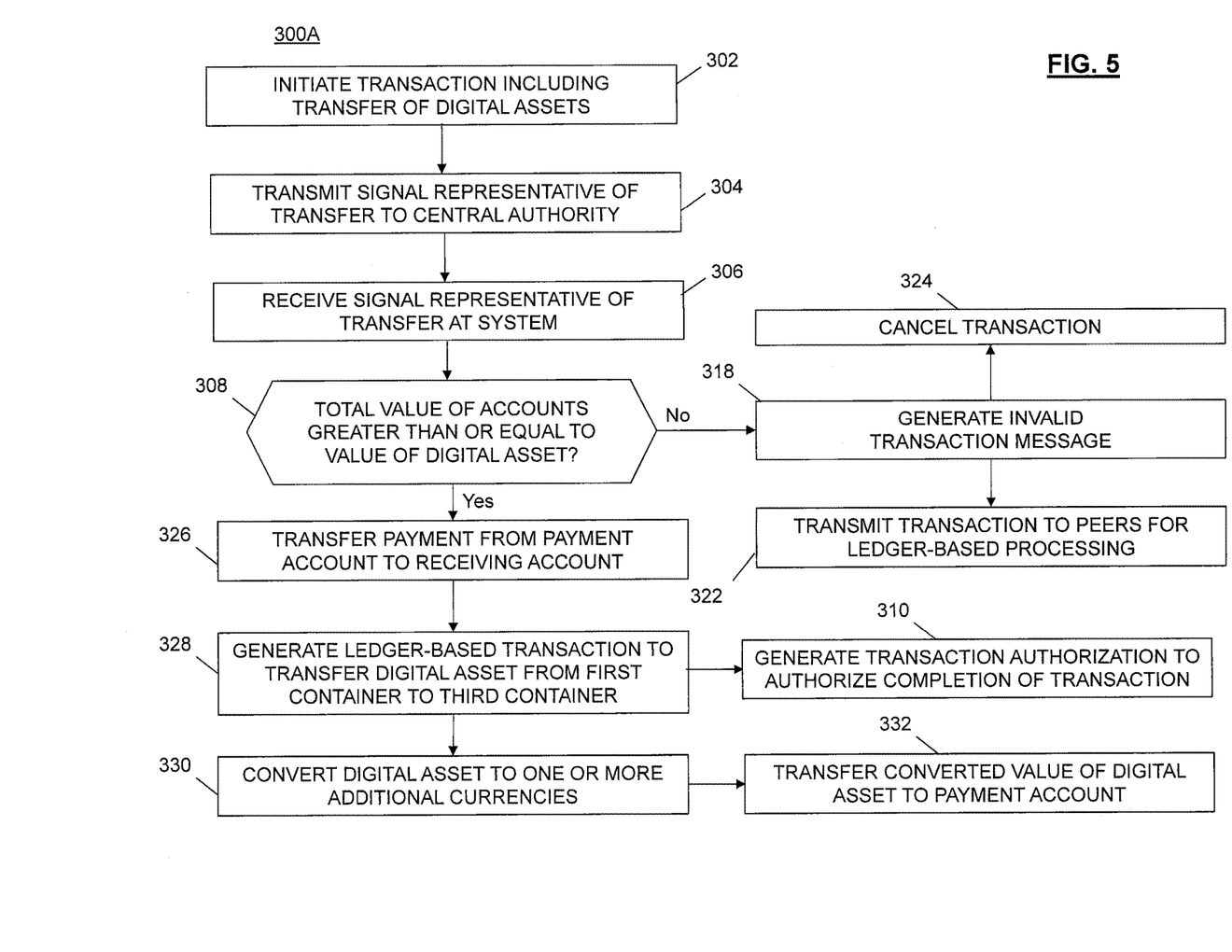
FIG. 5 is a flow chart of a method of authorizing a transaction including a transfer of a digital asset from a first digital container and payment from a source other than the first digital container, in accordance with some embodiments.

In some embodiments, payment for a transaction can be provided from one or more accounts other than the first digital container 170A. FIG. 5 illustrates one embodiment of a method 300a that provides transaction authorization and payment from a source other than the first digital container 170A. The steps 302-308, 310, and 318-324 of the method 300a are similar to the steps 302-308, 310, and 318-324 of the method 300, and similar description is not repeated herein. The method 300a includes additional steps to provide payment from an account other than a first digital container 170A. At step 326, the system 140 provides payment to the second client device 104 by transferring one or more monetary assets from a payment account 176 to a receiving account 178. The receiving account 178 is an account associated with the second client device 104. The receiving account 178 can be any suitable account, such as an account maintained by the central authority 150, an account external to the central authority, a digital container associated with the second client device 104, and/or any other suitable payment account. In some embodiments, the payment is equal to the value of the digital assets. In other embodiments, the payment is less than the value of the digital asset. For example, in some embodiments, the system 140 deducts a processing and/or transaction fee from the value of the digital asset and transfers the remaining value to the receiving account 178.

In some embodiments, the payment account 176 is an account associated with the central authority 150. For example, in some embodiments, the payment account includes a third digital container 170C storing one or more digital assets, such as a digital asset similar to the digital asset stored in the first and second digital containers 170A, 170B. In other embodiments, the payment account 176 includes a digital asset different than the digital asset stored in the first and second digital containers 170A, 170B. In still other embodiments, the payment account 176 includes a fiat currency account, such as a fiat currency account associated with the central authority 150.

In some embodiments, the payment account 176 is an account associated with the first client device 102. For example, the payment account 176 can be an account selected from the one or more accounts 172, 174 associated with the first client device 102. In some embodiments, the payment account 176 is an account associated with an entity other than the first client device 102, the central authority 150, and/or the second client device 104. For example, in some embodiments, the payment account 176 is an account associated with a financial institution having a relationship with one of the first client device 102, the second client device 104, and/or the central authority 150.

The transfer from the payment account 176 to the receiving account 178 is made instead of the transfer from the first digital container 170A to the second digital container 170B. For example, in some embodiments, after receiving transfer, the central authority 150 initiates a transfer from the payment account 176 to the receiving account 178 and does not transmit the original transfer to the one or more peers for processing.

At step 328, the system 140 generates a ledger-transfer to transfer the value of the digital asset from the first digital container 170A to an account associated with the owner of the payment account 176. For example, in some embodiments, the system 140 generates a transfer of digital assets from the first digital container 170A to the third digital container 170C. The transfer amount is equal to the value of the digital assets in the original transaction. The third digital container 170C is associated with and/or owned by the same entity associated with the payment account 176. For example, if the payment account 176 is an account owned and/or maintained by the central authority 150, the third digital container 170C is a digital container owned by and/or maintained by the central authority 150. As another example, if the payment account 176 is an account owned and/or maintained by a third party financial institution, the third digital container 170C is a digital container owned and/or maintained by the third party financial institution.

In some embodiments, the system 140 maintains a copy of a private key of the first client device 102 to allow the system 140 to generate block-chain ledger transactions on behalf of the first client device 102. In some embodiments, the system 140 maintains a master key associated with the digital asset that allows the system 140 to generate transactions involving any of the digital assets. From the first client device 102's perspective, the payment has been made in their currency of choice, e.g., a digital asset (such as Bitcoin™) and the second client device 104 has received immediate payment without the need to wait for, or even accept, transfer of the digital currency.

At an optional step 330, the system 140 converts the digital asset received in the third digital container 170C to at least one additional monetary unit. For example, the system 140 can convert the digital asset to one or more of a fiat currency, a second digital asset, a non-monetary financial asset, and/or any other suitable conversion. The conversion can be performed by the system 140, a clearing house (for example, a commercial clearing house for converting digital assets to fiat currencies), and/or any other suitable conversion mechanism. As a result of the conversion, a value equal to the digital asset of the original transaction is transferred from the third digital container 170C to one or more accounts, such as the payment account 176.

In some embodiments, the conversion at step 330 includes a conversion from a first digital asset to a second digital asset. For example, in some embodiments, a first client device 102 desires to complete a transaction using a first digital asset, such as a first crypto-currency. The second client device 104 does not maintain a digital container for the first digital asset, but does maintain a digital container 170C containing a second digital asset, such as a second crypto-currency. The system 140 transfers payment from the payment account 176 in the second crypto-currency to the digital container 170C. The system further executes a transfer of the first digital asset from the first digital container 170A to a third digital container 170C. The system converts the first digital asset received in the third digital container 170C to the second digital asset in the payment account 176. Such conversion allows the second client device 104 to accept payment in any form of digital asset while maintaining only a single digital container 170B containing only a single type of digital asset. At step 332, the converted value of the digital asset is transferred to the payment account 176.

In some embodiments, the method 300a allows the second client, device 104 (e.g., a retailer) to accept payment in one or more digital assets (such as a crypto-currency) without having to maintain a digital container 170B for each existing and/or later created digital asset. A central authority 150 can maintain digital containers 170C for each potential digital asset to receive payment from a first client device 102. The central authority 150 provides payment to the second client device 104 in a currency already accepted by the retailer, such as a fiat currency, a credit line, and/or any other suitable payment method.

Figure 6:
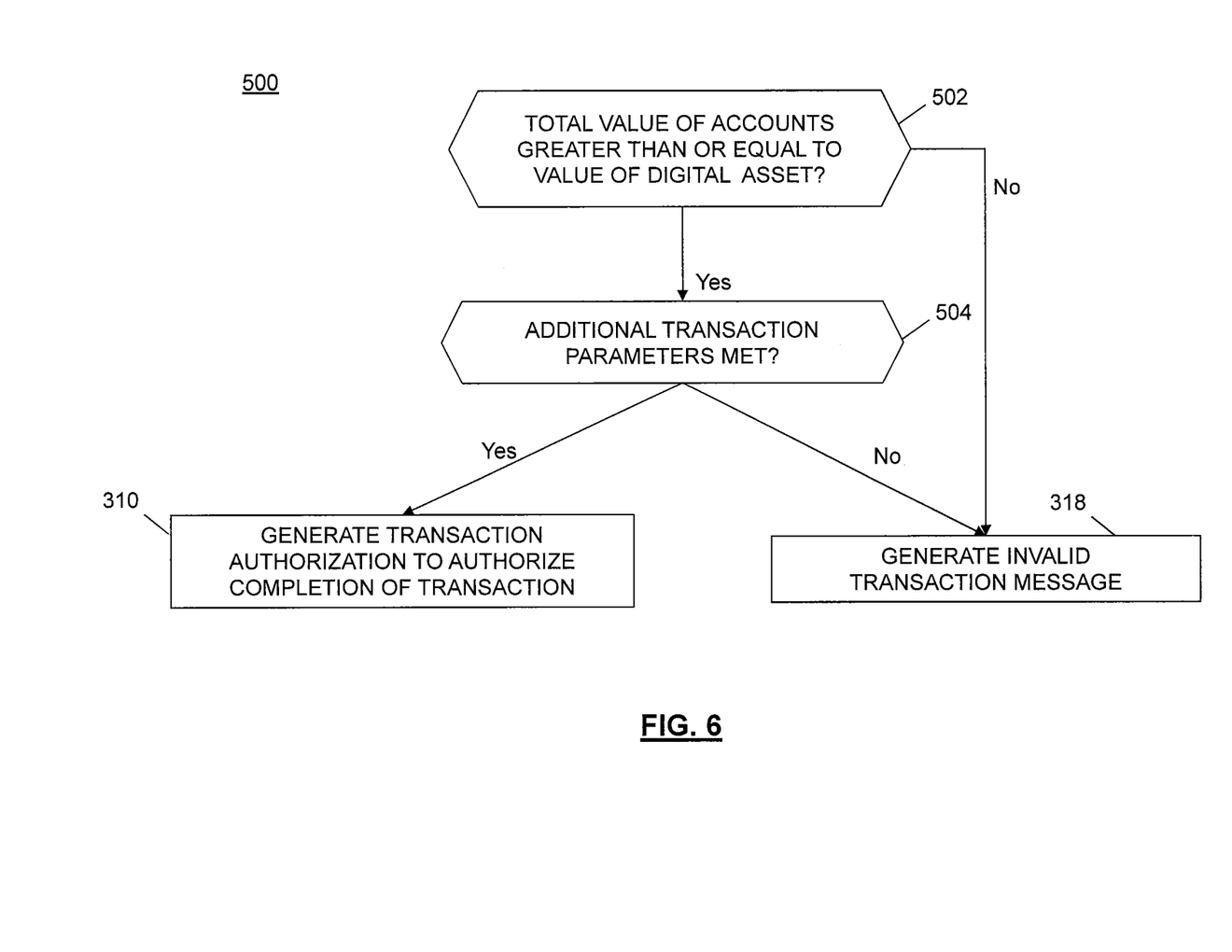
FIG. 6 is a flow chart of a method of real-time draft, in accordance with some embodiments.

In some embodiments, transaction authorization can be based on one or more additional parameters. FIG. 6 illustrates one embodiment of a method 500 for providing authorization of the transaction at step 308. At step 502 of the method 500, the system 140 compares the value of the digital asset to the value of one or more accounts associated with the first client per the method 400 illustrated in FIG. 4. At step 504, the system 140 compares one or more additional transaction parameters to one or more transaction rules maintained by the system 140. For example, in various embodiments, the system 140 maintains one or more transaction rules regarding a spending limit, a transaction type, a retailer identifier, a category of goods, and/or any other suitable rules. The system 140 compares each parameter of the transaction to a corresponding rule. If the transaction satisfies each of the one or more rules, the system 140 generates the transaction authorization according to step 310 of the method 300. If the transaction does not satisfy each of the one or more rules, the method proceeds to step 318 of the method 300.

In various embodiments, the transaction rules can be established by the first client 108 and/or an entity associated with the first client 108 (such as an employer, parent/ guardian, a bankruptcy trustee, etc.). The transaction rules limit transactions that are authorized by the system 140 to only those transactions meeting the predetermined criteria. In some embodiments, the transaction rules are established by the central authority 150.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. An apparatus, comprising:
    a communications interface;
    a memory; and
    a processor coupled to the memory and the communications interface, the memory storing software instructions for controlling the processor that, when executed by the processor, configure the processor to:
        receive, via the communications interface, a first request for a first transfer of digital assets from a first digital container associated with a first client device to a second digital container associated with a second client device, the first transfer being associated with an initiated transaction;
        when a total value in one or more first accounts associated with the first client device is equivalent to or exceeds a transfer value of the digital assets, generate and transmit, via the communications interface, a transaction authorization to the second client device, the transaction authorization causing the second client device to perform operations that complete the initiated transaction; and
        generate a draft from a payment account associated with a centralized authority to a second account associated with the second client, wherein a draft value of the first draft is equivalent to the transfer value.

2. The apparatus according to claim 1, wherein the processor is further configured to generate the draft from the payment account to the second account when digital assets in the first and second digital containers are different.

3. The apparatus according to claim 1, wherein a value of the second transfer is equal to the transfer value.

4. The apparatus according to claim 1, wherein the first account, the second account, and the payment account comprise currency accounts.

5. The apparatus according to claim 1, wherein the processor is further configured to apply a digital signature to the transaction authorization using a cryptographic key associated with the centralized authority.

6. The apparatus according to claim 1, wherein the processor is further configured to:
    determine that one or more parameters of the first request satisfy a plurality of rules associated with the first client device; and
    generate the draft from the payment account to the second account when the one or more parameters satisfy the plurality of rules associated with the first client device.

7. The apparatus according to claim 6, wherein the plurality of rules include at least one of a spending limit, a transaction type, a retailer identifier, a category of goods, or any combination thereof.

8. A system, comprising:
    a point-of-sale terminal having a storage device and a processor, the storage device being coupled to the processor and storing software instructions for controlling the processor that, when executed by the processor, configure the processor to:
        perform operations that initiate a transaction involving a first client device; and
        generate a first request for a first transfer of digital assets from a first digital container associated with the first client device to a second digital container associated with the point-of-sale terminal; and
    an authorization server having a server storage device and a server processor, the server storage device being coupled to the server processor and storing software instructions for controlling the server processor that, when executed by the server processor, configure the server processor to:
        receive the the first request from the point-of-sale terminal;
        based on the first request, determine that a total value in one or more first accounts associated with the first client device is equivalent to or exceeds a transfer value of the digital assets;
        validate the first request when the total value is equivalent to or exceeds the transfer value;
        generate and transmit a transaction authorization indicative of the validated first request to the point-of-sale terminal; and
        generate a draft from a payment account associated with a centralized authority to a second account associated with the point-of-sale terminal, wherein a draft value of the first draft is equivalent to the transfer value,
    wherein the processor of the point-of-sale terminal is further configured to receive the transaction authorization and complete the initiated transaction based on the transaction authorization.

9. The system according to claim 8, wherein:
    at least one of the one or more first accounts is denominated in a first currency;
    the draft value is denominated in a second currency; and
    the server processor is further configured to generate the draft from the payment account to the second account when digital assets in the first and second digital containers are different.

10. The system according to claim 8, wherein the server processor is further configured to:
    generate a second request for a second transfer of the digital assets from the first digital container to a third digital container associated with the centralized authority, wherein a value of the second transfer is equal to the transfer value; and transmit the second request to one or more peer systems, the second request causing the one or more peer systems to perform operations that record information identifying the second transfer within a ledger block of a distributed ledger.

11. The system according to claim 8, wherein the server processor is further configured to:
determine that one or more parameters of the first request satisfy a plurality of rules associated with the first client device; and
validate the first request when the one or more parameters satisfy the plurality of rules associated with the first client device.

12. A computer-implemented method, comprising
receiving, by at least one processor, a first request for a first transfer of digital assets from a first digital container associated with a first client device to a second digital container associated with a second client device, the first transfer being associated with an initiated transaction;
when a total value in one or more first accounts associated with the first client device is equivalent to or exceeds a transfer value of the digital assets, generating and transmitting, by the at least one processor, a transaction authorization to the second client device, the transaction authorization causing the second client device to perform operations that complete the initiated transaction; and
generating, by the at least one processor, a draft from a payment account associated with a centralized authority to a second account associated with the second client, wherein a draft value of the first draft is equivalent to the transfer value.

13. The computer-implemented method of claim 12, further comprising:
generating, by the at least one processor, a second request for a second transfer of the digital assets from the first digital container to a third digital container associated with the centralized authority; and
transmitting, by the at least one processor, the second request to one or more peer systems, the second request causing the one or more peer systems to perform operations that record information identifying the second transfer within a ledger block of a distributed ledger.

14. The computer-implemented method of claim 13, wherein:
the first request comprises information identifying a quantity of the digital assets associated with the requested first transfer;
the transfer value comprises a value of the identified quantity of the digital assets; and
the recordation of the information identifying the second transfer onto the ledger block of the distributed ledger transfers the quantity of the digital assets from the first digital container to the third digital container.

15. The computer-implemented method of claim 13, wherein:
at least one of the one or more first accounts is denominated in a first currency;
the second account is denominated in a second currency; and
the computer-implemented method further comprises converting the transfer value into the second currency and establishing the converted transfer value as the draft value.

16. The computer-implemented method of claim 12, wherein:
the first digital container is established by a first application program executed at the first client device;
the second digital container is established by a second application program executed at the second client device; and
at least one of the first or second application programs comprise a mobile wallet application.

17. The apparatus of claim 1, wherein the processor is further configured to:
generate a second request for a second transfer of the digital assets from the first digital container to a third digital container associated with the centralized authority; and
transmit the second request to one or more peer systems, the second request causing the one or more peer systems to perform operations that record information identifying the second transfer within a ledger block of a distributed ledger.

18. The apparatus of claim 17, wherein:
the first request comprises information identifying a quantity of the digital assets associated with the requested first transfer;
the transfer value comprises a value of the identified quantity of the digital assets; and
the recordation of the information identifying the second transfer onto the ledger block of the distributed ledger transfers the quantity of the digital assets from the first digital container to the third digital container.

19. The apparatus of claim 1, wherein:
the first digital container is established by a first application program executed at the first client device;
the second digital container is established by a second application program executed at the second client device; and
at least one of the first or second application programs comprise a mobile wallet application.

20. The apparatus of claim 1, wherein:
at least one of the one or more first accounts is denominated in a first currency;
the second account is denominated in a second currency; and
the processor is further configured to convert the transfer value into the second currency and establish the converted transfer value as the draft value.

* * * * *